United States Patent [19]

Rascati et al.

[11] 4,433,923

[45] Feb. 28, 1984

[54] OPERATIVE TEMPERATURE SENSING SYSTEM

[75] Inventors: Richard J. Rascati, Guilford; Larry G. Berglund, Branford, both of Conn.

[73] Assignee: Morris L. Markel, North Tonawanda, N.Y.

[21] Appl. No.: 289,268

[22] Filed: Aug. 3, 1981

[51] Int. Cl.³ .................. G01K 3/14; G01K 13/00
[52] U.S. Cl. .................. 374/112; 374/109; 374/166; 374/120; 340/584
[58] Field of Search ............... 374/101, 109, 110, 114, 374/132, 148, 112, 170, 120, 2

[56] References Cited

U.S. PATENT DOCUMENTS

| | | | |
|---|---|---|---|
| 2,603,422 | 7/1952 | Sargeaunt | 374/110 X |
| 3,091,957 | 6/1963 | Hampton | 374/163 X |
| 4,068,138 | 1/1978 | Miyakawa et al. | 374/170 X |
| 4,073,190 | 2/1978 | MacHattie et al. | 374/109 |
| 4,109,197 | 8/1978 | Carmody | 374/183 X |
| 4,130,019 | 12/1978 | Nitschke | 374/110 |
| 4,181,957 | 1/1980 | Pinckaers | 374/170 X |
| 4,297,851 | 3/1981 | Paddock et al. | 374/183 X |
| 4,301,682 | 11/1981 | Everest | 374/112 |

OTHER PUBLICATIONS

Publ. "Thermal Environmental Conditions for Human Occupancy" ANSI/ASHRAE 55-1981, pp. 1-15.
Publ. "LM3911 Temperature Controller" by National Semiconductor, pp. 9-100-9-104.
Publ. "Wet Globe Thermometer" Howard Engineering Co., Bethlehem, Pa., Jun. 1970, Three (3) pages.
Publ. "Solarware Globe Thermometer Systems" Solarware Inc., Vermont 1969, Four (4) pages.

*Primary Examiner*—Daniel M. Yasich
*Attorney, Agent, or Firm*—Allen J. Jaffe

[57] ABSTRACT

An operative temperature sensing system including an air temperature sensor, a globe-type temperature sensor and a circuit for modifying the air temperature signal and the globe temperature signal by predetermined factors whereby the modified signals are combined to generate a signal that is a function of operative temperature.

12 Claims, 2 Drawing Figures

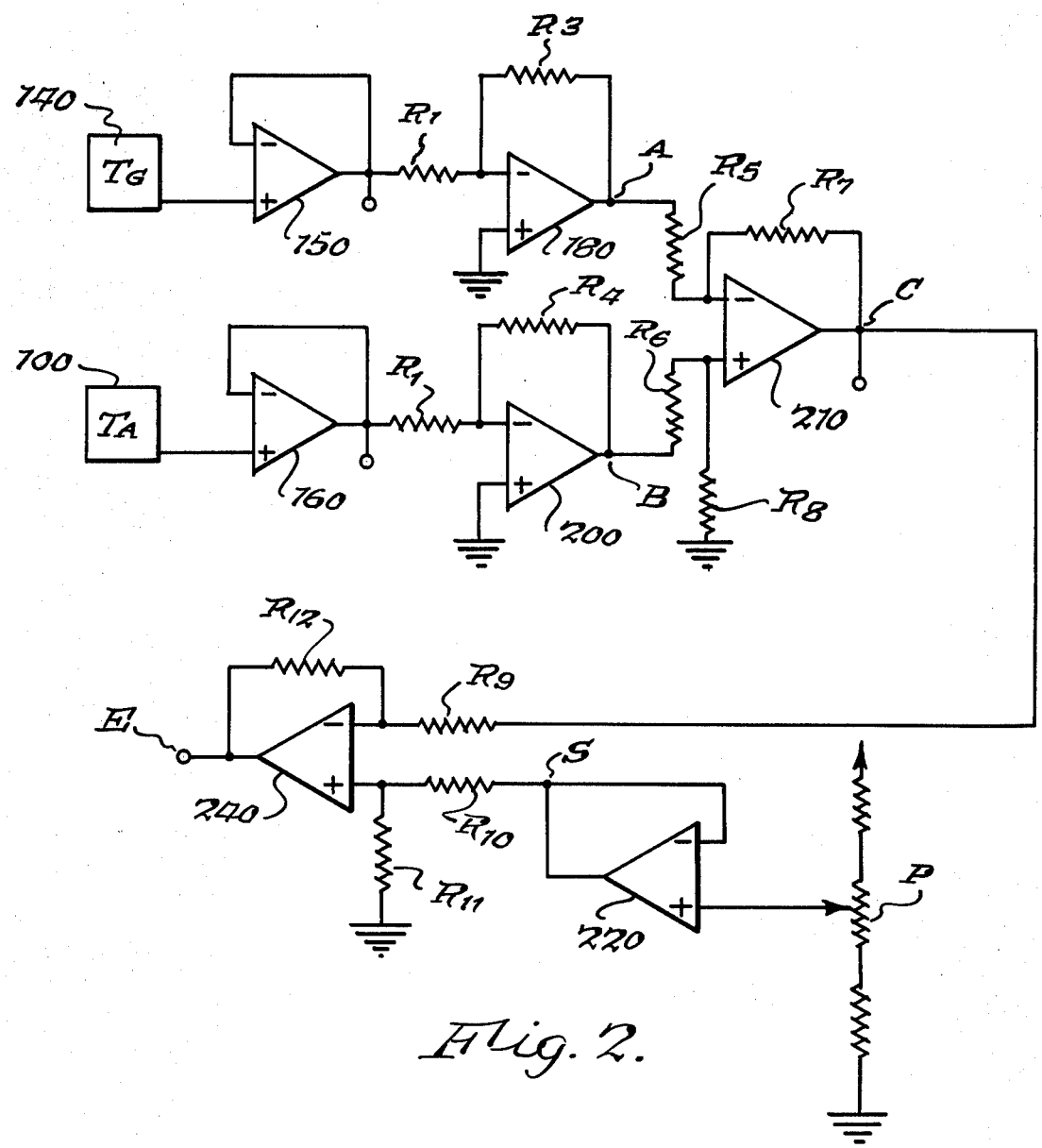
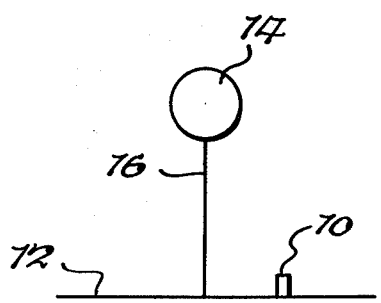
Fig. 2.
Fig. 1.

OPERATIVE TEMPERATURE SENSING SYSTEM

BACKGROUND OF THE INVENTION

The present invention relates to an operative temperature sensing system and, more particularly, to such a system that accurately, simply and inexpensively senses (for indication and/or control purposes) the operative temperature which closely approximates the thermal environmental sensing capabilities of a human being.

As used herein the term "operative temperature" is qualitatively defined as: "the uniform temperature of a radiantly black enclosure in which an occupant would exchange the same amount of heat by radiation plus convection as in the actual nonuniform environment". Quantitatively "operative temperature" is the average, weighted by respective heat transfer coefficients, of the air and mean radiant temperatures, or:

$$T_o = (H_c T_a + H_r T_r)/(H_c + H_r)$$

wherein:
$T_o$ = operative temperature
$T_a$ = air or ambient temperature
$T_r$ = mean radiant temperature
$H_c$ = convective heat transfer coefficient
$H_r$ = radiative heat transfer coefficient.

The prior art is replete with proposed devices which sense factors which purport to correlate human or animal comfort levels with such sensed variables; however, none appear to sense operative temperature (as defined above) in a simple inexpensive and accurate system.

Among such prior art are the following prior U.S. Patents:

1. U.S. Pat. No. 2,685,795—relates to a panradiometer consisting of four spheres of differing emmissivities to thereby detect total environmental radiation by heat balancing techniques.

2. U.S. Pat. No. 2,739,204—relates to a space thermostat wherein a single ambient temperature sensor is exposed so as to be sensitive to heat radiating from radiators within the space to be heated.

3. U.S. Pat. No. 3,062,941—relates to a radiation sensitive infrared control for animal heating wherein a globular sensing unit, containing an electrical heating element and a thermistor, is employed to control the infrared source in response to variations in ambient temperature within the globe.

4. U.S. Pat. No. 3,092,997—relates to a heat sensing device wherein a single thermistor is housed within a dome and is shielded from sunlight such that the heat of radiation is transferred at a relatively uniform rate thereto.

5. U.S. Pat. No. 3,246,838—relates to controls for infrared emitters wherein a thermostatic element is provided with a heater for artificially raising the temperature of the surface of the element to approximate the temperature at the surface of the human body.

6. U.S. Pat. No. 3,531,991—relates to a mean radiation temperature meter employing at least three radiation sensing elements having different thermal emmissivity characteristics.

7. U.S. Pat. No. 4,058,254—relates to a temperature monitoring and control system wherein the surface of the sensing means has a radiant absorbtion coefficient which corresponds to that of a human being whereby the output signal therefrom is used to control the occupied space so that the surface of the sensing means is maintained constant in an attempt to maintain thermal comfort.

8. U.S. Pat. No. 4,073,190—relates to a cold stress meter wherein a measurement is obtained that takes into account the effects on body heat loss, of sun, wind and air temperature. A bead transistor is responsive to both ambient temperature and wind. Other means are provided that are representative of the nonevaporative rate of body heat loss, thermal insulation resistance of still air outside of clothing, fraction of full sunlight intensity reaching a person wearing clothing and the absorbtance of the clothing.

9. U.S. Pat. No. 4,123,939—relates to a device for sensing total thermal energy received by an object in a given location wherein thermocouples are placed within a sphere to provide a signal indicative of the thermal energy gradients within the sphere.

10. U.S. Pat. No. 4,164,869—relates to a thermostat for radiant room heating wherein a thin film sensor is used in a bridge network to provide an error signal to actuate a heater.

SUMMARY OF THE INVENTION

As noted above, operative temperature ($T_o$) is a function of ambient or air temperature ($T_a$) and mean radiant temperature ($T_r$). According to the teachings of the present invention it is not necessary to employ complex and expensive measuring devices to determine mean radiant temperature. Instead, two temperature sensors are employed: an ambient temperature sensor and a globe-type temperature sensor. As used herein the term "globe or globe-type" should not be construed as a spherically shaped chamber, as other shaped chambers or vessels can be employed. However, as is well known, spherical shapes may have distinct advantages over other shapes.

More specifically, an ambient or air temperature sensor is located adjacent to the exterior of a globe. The globe has contained therewithin a second sensor which senses the temperature within the globe ($T_g$) as is well known. However, since globe temperature ($T_g$) is a function of the mean radiant temperature ($T_r$) and the ambient temperature ($T_a$), the operative temperature ($T_o$) then becomes a function of the air temperature and the globe temperature. Thus, signals generated by the air temperature sensor and the globe temperature sensor are representative of the operative temperature.

Essentially then the present invention provides an operative temperature sensing system comprising first temperature sensing means for generating a first signal that is a function of the air temperature in a space, a closed chamber, second temperature sensing means located in the chamber for generating a second signal that is a function of the temperature within the chamber, signal modifying means for changing the values of the first and second signals by predetermined amounts, and means for combining the modified first and second signals to develop an output signal that is a function of operative temperature.

Other features and advantages of the present invention will become readily apparent as the ensuing description thereof preceeds.

BRIEF DESCRIPTION OF THE DRAWINGS

For a fuller understanding of the present invention reference should be had to the following detailed description thereof taken in conjunction with the accompanying drawings, wherein:

FIG. 1 is a diagrammatic representation of the ambient and globe temperature sensors of the present invention; and FIG. 2 is a circuit diagram of the electronic components for developing an output signal indicative of operative temperature from the sensors illustrated in FIG. 1.

DETAILED DESCRIPTION OF THE PREFERRED EMBODIMENT

As indicated above, the operative temperature ($T_o$) is given by $(H_cT_a+H_rT_r)/(H_c+H_r)$. The sensing system of the present invention includes an air or ambient temperature sensor 10 (depicted schematically in FIG. 1) which senses $T_a$ in an enclosure, such as a room. Sensor 10 may be suitably mounted on a base or support 12 and is located adjacent a globe which is mounted on a suitable pedestal or the like 16. Globe 14 is shown as a spherical chamber or vessel (other suitable shapes may be employed) having housed therein a second temperature sensor (not illustrated in FIG. 1) which develops a signal indicative of the temperature within the globe, as is well known. This temperature ($T_g$) is a function of mean radiant temperature ($T_r$) in the enclosure or room. Since the globe 14 and the sensor housed therewithin are well known in the art, the specific construction thereof will not be further discussed; and it is to be understood that the numeral 14 will be hereinafter employed to depict the globe thermometer as a unit, including the sensor housed within the globe.

According to the present invention temperatures $T_a$ and $T_g$ are suitably modified or weighted by predetermined constants and combined such that an output signal is developed that is a function of operative temperature ($T_o$).

Referring to FIG. 2, the sensor 10 is schematically represented at 100 and the sensor within globe 14 is represented at 140. The signals from 140 and 100 are suitably amplified by amplifiers 150 and 160, respectively, which may be high impedance buffer amplifiers which allow the high output impedance of the temperature sensors to be inputed to the remaining control circuitry. The outputs from amplifiers 150 and 160 (representative of $T_g$ and $T_a$) are fed through series resistors $R_1$ to second amplifiers 180 and 200, respectively. Feedback resistors $R_3$ and $R_4$ are provided across amplifiers 180 and 200, respectively, such that the output signal of amplifier 180 at point A is equal to $(R_3/R_1) T_g$ and the output signal of amplifier 200 at point B is equal to $(R_4/R_1) T_a$. It should be apparent that $R_3/R_1$ and amplifier 180 and $R_4/R_1$ and amplifier 200 function as modifying circuit means for the signal from globe sensor 140 and air sensor 100, respectively. These signals are combined through amplifier 210, resulting in an output signal at point C which is equal to $(R_3/R_1) T_g - (R_4/R_1) T_a$; the values of resistors $R_5, R_6, R_7$ and $R_8$ all being equal to each other. It should thus be readily apparent that proper choice of the values or range of values of $R_1, R_3$ and $R_4$ will result in a signal at point C that is a function of operative temperature ($T_o$).

This signal at point C then may be compared to a set point reference signal at point S, which is suitably developed by a variable potentiometer P and an amplifier 220, to determine the difference in value between $T_o$ and a setpoint temperature ($T_s$) for control and/or indication purposes. To this end the signals at point C and point S are fed into a comparative amplifier 240 to generate an error signal at point E indicative of the difference therebetween. Thus, the signal at point E is equal to the algebraic sum of $T_s$ and $T_o$. The resistors $R_9, R_{10}, R_{11}$ and $R_{12}$ may all be of equal value.

An example of the manner in which the predetermined values $R_3/R_1$ and $R_4/R_1$ may be determined as weighting factors for $T_a$ and $T_g$ will now be discussed. However, it should be understood that the actual values given are exemplary of one set of parameters and should, therefore, not be interpreted as universally applicable.

According to ASHRAE standard 55-81 at air speeds less than 40 feet/minute:

$$T_o = 0.42 T_a + 0.58 T_r.$$

However, since (at steady state) the heat absorbed by the globe 14 by radiation is equal to the heat transferred by the globe by convection, then:

$$T_r = T_g + H_c/H_r(T_g - T_a).$$

Under test conditions, it may be determined that:

$$H_c/H_r = 1.2.$$

When using a hollow sphere having a diameter of substantially 1½ inches for globe 14, then, from the above:

$$T_r = T_g + 1.2(T_g - T_a)$$

and:

$$T_o = 0.42 T_a + 0.58(2.2 T_g - 1.2 T_a)$$

or:

$$T_o = 1.276 T_g - 0.276 T_a.$$

Thus, it can be seen that the value of $R_3/R_1$ should substantially equal 1.28 and the value of $R_4/R_1$ should substantially equal 0.28. In this example, then, resistor values for $R_1, R_3$ and $R_4$ of 10K, 12.8K, and 2.8K, respectively, would provide the ASHRAE standard for $T_o$ wherein a 1½ inch diameter hollow sphere is used for globe 14. The sphere may be fabricated of any suitable material, as is well known in the art. It is also apparent that the relationship between the fixed and predetermined values of $R_3/R_1$ and $R_4/R_1$ is such that when the two are added together or summed, the resulting value $(1.28 + (-0.28) = 1)$ will always be one or unity, as will be the sum of the weighting factors (0.42 and 0.58) for $T_a$ and $T_r$, respectively.

It should be realized that other sizes, shapes and types of globes would result in other values for $R_1, R_3$ and $R_4$. Also, larger air currents would similarly result in other values for these resistors. In fact, globe 14 could be of any regular or irregular geometric shape.

Many different types of sensors may be used for sensing $T_a$ and $T_g$; however it has been found that sensors such as National Semiconductor LM 3911 produce accurate and linear results. The output of each sensor may be calibrated to be 10 MV/°C.

Although, the present invention has provided a simple (yet effective) technique and structure for quickly and inexpensively determining operative temperature, changes will obviously occur to those skilled in the art. It is therefore intended that the present invention is to be limited only by the scope of the appended claim.

What is claimed is:

1. An operative temperature sensing system wherein operative temperature is the uniform temperature of a radiantly black enclosure in which an occupant would exchange the same amount of heat by radiation plus convection as in the actual nonuniform environment, the system comprising:
   first temperature sensing means for generating a first signal having a value that is a function of the air temperature within an enclosed space;
   a chamber;
   second temperature sensing means including said chamber located within said enclosed space, for generating a second signal having a value that is a function of mean radiant temperature;
   first signal modifying circuit means for changing the value of said first signal by a first fixed and predetermined amount;
   second signal modifying circuit means for changing the value of said second signal by a second fixed and predetermined amount;
   said first and second fixed and predetermined amounts representing values that are functions of the size and shape of said second temperature sensing means and are so related to each other that their sum is equal to unity; and
   circuit means for combining the modified first and second signals to develop an output signal having a value that is a function of operative temperature within the enclosed space.

2. The system according to claim 1, wherein:
   said first temperature sensing means is located adjacent to said second temperature sensing means.

3. The system according to claim 1, wherein:
   said means for combining comprises an amplifier for summing said modified signals.

4. The system according to claim 1, further comprising:
   set point reference signal generating means for developing an output signal that is a function of a desired set point temperature; and
   means responsive to said last mentioned output signal and said first mentioned output signal for developing an error signal that is a function of the difference therebetween.

5. The system according to claim 1, wherein:
   each of said signal modifying circuit means includes an amplifier having feedback resistors which provide said first and second fixed and predetermined values.

6. The system according to claim 5, wherein:
   said feedback resistors have resistance values such that said first signal is modified by a factor substantially equal to 0.28 and said second signal is modified by a factor substantially equal to 1.28.

7. The system according to claim 6, further comprising:
   set point reference signal generating means for developing an output signal that is a function of a desired set point temperature; and
   means responsive to said last mentioned output signal and said first mentioned output signal for developing an error signal that is a function of the difference therebetween.

8. The system according to claim 1, wherein:
   said mean radiant temperature sensing means and said chamber comprises a globe thermometer.

9. The system according to claim 8, wherein:
   each of said signal modifying circuit means includes an amplifier having feedback resistors which provide said first and second fixed and predetermined values.

10. The system according to claim 9, wherein:
    said feedback resistors have resistance values such that said first signal is modified by a factor substantially equal to 0.28 and said second signal is modified by a factor substantially equal to 1.28.

11. The system according to claim 10, wherein:
    said globe thermometer includes a spherical chamber having a diameter of substantially 1.5 inches.

12. The system according to claim 10, further comprising:
    set point reference signal generating means for developing an output signal that is a function of a desired set point temperature; and
    means responsive to said last mentioned output signal and said first mentioned output signal for developing an error signal that is a function of the difference therebetween.

* * * * *